US011283696B2

(12) United States Patent
Eardley et al.

(10) Patent No.: US 11,283,696 B2
(45) Date of Patent: Mar. 22, 2022

(54) DIAGNOSTIC TESTING IN NETWORKS

(71) Applicant: BRITISH TELECOMMUNICATIONS PUBLIC LIMITED COMPANY, London (GB)

(72) Inventors: Philip Eardley, London (GB); Trevor Burbridge, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 817 days.

(21) Appl. No.: 15/527,475

(22) PCT Filed: Nov. 16, 2015

(86) PCT No.: PCT/EP2015/076672
§ 371 (c)(1),
(2) Date: May 17, 2017

(87) PCT Pub. No.: WO2016/079046
PCT Pub. Date: May 26, 2016

(65) Prior Publication Data
US 2017/0324627 A1 Nov. 9, 2017

(30) Foreign Application Priority Data

Nov. 19, 2014 (EP) .................................... 14275242

(51) Int. Cl.
H04L 12/26 (2006.01)
H04L 43/065 (2022.01)
(Continued)

(52) U.S. Cl.
CPC ........ *H04L 43/065* (2013.01); *H04L 41/0893* (2013.01); *H04L 41/142* (2013.01);
(Continued)

(58) Field of Classification Search
USPC .......... 709/201–202, 223–224; 707/2, 3, 10, 707/103, 104
See application file for complete search history.

(56) References Cited

U.S. PATENT DOCUMENTS 6,295,527 B1 9/2001 McCormack et al.
7,165,192 B1 * 1/2007 Cadieux .............. H04L 41/0631
714/43

(Continued)

OTHER PUBLICATIONS

International Search Report for PCT/EP2015/076672, dated Dec. 23, 2015, 4 pages.

(Continued)

Primary Examiner — Younes Naji
Assistant Examiner — Da T Ton
(74) Attorney, Agent, or Firm — Nixon & Vanderhye P.C.

(57) ABSTRACT

Methods and apparatus are disclosed for obtaining diagnostic test results in respect of network elements in a network, the test results being obtained from a population of probes associated with network elements. The method comprises receiving a first-stage set of probe reports comprising, in respect of probes in an initial subset, a test result and metadata, each test result indicating a state of the network element associated with the probe; identifying a specific subset of probes in the initial subset wherein the test results from the probes in the specific subset satisfy a predefined condition; determining a subsequent subset based on the metadata of the probes in the specific subset; and triggering the probes in the subsequent subset to provide a second-stage set of probe reports comprising test results indicating states of network elements associated with probes in the subsequent subset.

24 Claims, 6 Drawing Sheets

(51) Int. Cl.
*H04L 43/04* (2022.01)
*H04L 43/12* (2022.01)
*H04L 43/50* (2022.01)
*H04L 41/142* (2022.01)
*H04L 41/0893* (2022.01)

(52) U.S. Cl.
CPC .............. *H04L 43/04* (2013.01); *H04L 43/12* (2013.01); *H04L 43/50* (2013.01)

(56) References Cited

U.S. PATENT DOCUMENTS

| | | | |
|---|---|---|---|
| 7,222,147 | B1 | 5/2007 | Black et al. |
| 2004/0162898 | A1 | 8/2004 | Rich |
| 2008/0148039 | A1* | 6/2008 | Cobb .................. G06F 11/3612 713/100 |
| 2008/0192641 | A1 | 8/2008 | Claise et al. |
| 2010/0049559 | A1* | 2/2010 | Carbone .......... G06Q 10/06395 705/7.41 |
| 2012/0117404 | A1* | 5/2012 | Lorch ................... G06F 1/3228 713/323 |
| 2012/0311132 | A1* | 12/2012 | Tychon ................. H04L 43/026 709/224 |
| 2013/0217589 | A1 | 8/2013 | Xu et al. |

OTHER PUBLICATIONS

Written Opinion of the ISA for PCT/EP2015/076672, dated Dec. 23, 2015, 5 pages.
EP Search Report for EP Appln No. 14275242.7, dated May 4, 2015, 6 pages.
"SamKnows Test Methodology: Methodology and technical information relating to the SamKnows testing platform", *Sam Knows*, Document Reference: SQ301-002-EN, Mar. 2014, 11 pages.
"SamKnows Real-Time Reporting Platform: SamKnows Analytics White Paper", *Sam Knows*, Document Reference: SQ316-001-EN, Mar. 2014, 9 pages.

* cited by examiner

DIAGNOSTIC TESTING IN NETWORKS

This application is the U.S. national phase of International Application No. PCT/EP2015/076672 filed 16 Nov. 2015, which designated the U.S. and claims priority to EP Patent Application No. 14275242.7 filed 19 Nov. 2014, the entire contents of each of which are hereby incorporated by reference.

TECHNICAL FIELD

The present invention relates to diagnostic testing in respect of network elements in a network, and in particular in respect of a digital communications network such as the Internet. Aspects and embodiments of the invention relate to methods and apparatus for obtaining diagnostic test results in respect of network elements in a network, and to a corresponding computer program element.

In particular, preferred embodiments of the invention allow an entity such as a network service provider providing network services to its customers' home or local area or mobile networks to obtain and act upon diagnostic test results in respect of network elements such as hub, gateway or other devices in, at or near the boundary of those home or local area networks, or in respect of network elements such as home or local area networks themselves, or portions thereof, in a manner that allows issues affecting performance to be identified and understood quickly and/or efficiently.

BACKGROUND TO THE INVENTION AND PRIOR ART

How customers rate the service they receive from their various internet-connected (or otherwise networked) computing and telephony devices depends to a large extent on the Quality of Experience (QoE) they perceive for internet-delivered (or, more generally, network-delivered) services. The Quality of Experience perceived generally depends on the Quality of Service (QoS) that can be achieved end-to-end (e.g. from a content origin server or a remote device to a user-device in the home). In turn the QoS achieved generally depends on a number of network characteristics. Examples of network characteristics include loss, Round Trip Time, jitter and throughput. While QoE is essentially subjective, it depends at least in part on (and can be inferred from) suitably-defined measures of QoS, which can be calculated from network metrics relating to suitably-chosen and measurable network performance characteristics. A variety of different types of network performance characteristics or combinations thereof may be chosen and/or applicable in defining a measure of QoS. Network operators may be able to measure these in relation to data traversing paths across networks over which they have control, or between devices under their control, but they may not have sufficient control for such measurements over other networks, or of the devices therein, and therefore may be unable to obtain direct measurements of characteristics from points at which they provide a direct indication of their effect on performance from the point of view of end-users.

In particular, network operators may not have sufficient control to obtain the desired measurements from networks such as their customers' "home networks" or other such "user networks" (generally, "local" networks), or the devices therein.

Another situation in relation to which network operators may not be able to obtain the desired measurements may be where a mobile device moves from one access network to another, and potentially between technologies such as 4G and wireless LAN.

A further such situation may arise in relation to a global or multi-country operator which in some countries does not have its own network and so uses network services from third parties, and wishes to monitor the performance provided by those third parties.

Performance over the final network segment can have a significant effect on the experience of users, and in general, performance within home networks can be a problem for network operators or Internet Service Providers (ISPs) because it is largely invisible to them, but is the ultimate cause of a large number of calls to network operator or ISP helplines.

Various tools exist which enable end-users to test the performance of their own local network, but these do not necessarily provide data to network operators or ISPs in respect of performance as experienced from within local networks. There are ways for an ISP to monitor performance to home and other local networks, such as using Deep Packet Inspection (DPI) or by placing probes within homes and local networks which can provide reports to the ISP. Probes such as those under the "SamKnows" scheme can be used, information about which is available online at www.samknows.com. While DPI can be computationally intensive, probes such as "SamKnows" probes are becoming more popular. These can be in the form of stand-alone devices that can be located next to a user's home hub or gateway device, but are increasingly being incorporated into equipment such as home hubs or gateway devices that can then be located within home or other local networks. Such devices are generally provided to users by ISPs, and may remain under their ownership and/or control, allowing for suitable probes to be located within home or other networks, from which locations they may perform tests as required by ISPs or other controlling entities and provide reports thereto as and when instructed, allowing performance issues in respect of such networks to be monitored. "Probes" can also be software incorporated in consumer devices, including mobile devices, or in networking equipment such as routers.

Such tests are generally performed based on communication between such probes (located within or adjacent to users' home hubs, or elsewhere) and test-servers in the network. Other tests may monitor existing traffic, for example to count all the traffic sent from the customer's home network to the Internet. Results may be displayed to an ISP analyst on a dashboard, and may be aggregated according to where the probe is located in the overall network topology (e.g. in terms of which Retail Access Node (RAN) and/or Aggregation Point (AP), or otherwise). The probes can be triggered to provide information or response packets allowing test measurements to be made for characteristics such as download speed, upstream UDP packet loss, DNS resolution time, etc.

Specific information about the "SamKnows" probes and test methodology is available in a document entitled: "SamKnows Test Methodology: Methodology and technical information relating to the SamKnows testing platform" (Document Reference: SQ301-002-EN, dated March 2014), which is available online at: http://www.samknows.com/broadband/uploads/methodology/SQ301-002-EN-Test-Suite-Whitepaper.pdf
and in a document entitled: "SamKnows Real-Time Reporting Platform: SamKnows Analytics White Paper" (Document Reference: SQ316-001-EN, also dated March 2014), available at: http://www.samknows.com/broadband/uploads/methodology/SQ316-001-EN-SamKnows-Analytics-Whitepaper.pdf, which discusses the use of metadata in the analysis of measurement results.

Deploying probes into or alongside home hubs and the like will increase considerably a volume of information generated by the probes, especially where a number of probes and/or a quantity of information or frequency of its generation by probes is high. Both the test traffic and the signals that control the probe and report its results contribute to the volume. Where such information is communicated via a network, there is a prospect of flooding the network, which can affect network performance. Significant processing resources and power may be needed to analyse all of the received data, which may be unavailable or prohibitively expensive.

It would therefore be advantageous to provide methods and apparatus which assist with the gathering and processing of diagnostic test results suitable for such analysis, while overcoming the disadvantages with known diagnostic techniques.

Referring briefly to prior patent publications, United States application US2008/0192641 ("Claise et al") relates to methods and apparatus for the automatic discovery of blocking access control list (ACL) identification and match statements in a network. One such method disclosed comprises receiving an incoming probe packet in a network device; de-encapsulating the incoming probe packet to provide a packet content portion and a drop result portion; testing the packet content portion against a local ACL to determine a local drop result; and inserting the local drop result and encapsulating an outgoing probe packet.

U.S. Pat. No. 7,222,147 ("Black et al") relates to methods and systems for processing network management data in accordance with metadata files. In particular, it discloses a management system internal to a network device that sends various management data files and corresponding metadata files to a management system external to the network device. The external management system then uses the metadata files to process the management data files. As a result, the external management system dynamically learns how to manage a network device through the metadata files.

U.S. Pat. No. 6,295,527 ("McCormack et al") relates to real-time user-defined creation of network device information collections. In one aspect, it discloses a method for establishing groups of logical objects, the method comprising storing group criteria data that represents available criteria that may be used to define one of the groups; receiving user input that defines one of the groups by specifying a subset of the group criteria data that logical objects in the group must satisfy; responding to a request to view that group by determining current membership of that group by retrieving the group criteria data from the database and comparing the subset of the group criteria data against device data about all the logical objects.

United States application US2004/162898 ("Rich") relates to a dedicated networked device monitoring system that enables a user to create, download and store customised tests to a dedicated networked device monitor connected to networked devices. The system may perform repeated tests on the devices, determine if the devices are functioning correctly, and dispatch alerts and control commands if the devices are not functioning correctly. The dedicated monitor may perform certain monitor and control functions without delay from computer or network throughput problems. The monitoring system may include the ability to customize and store to a library network device specific tests that may be re-used and applied to different devices through an administrative tool.

United States application US2013/217589 ("Xu et al") relates to methods, systems and apparatus for identifying agents with desired biological activity. Specifically, the methods, systems, and apparatus identify functional relationships between multiple agents and/or between one or more agents and a condition of interest. Data of multiple experimental batches are normalised, batch effects accounted for, and the adjusted data used to create a projection matrix or function. The projection matrix is used to project the data into a projection space, in which the distance between a query agent or a query condition and various candidate agents may be determined.

SUMMARY OF THE INVENTION

According to a first aspect of the invention, there is provided a method of obtaining diagnostic test results in respect of network elements in a network, the test results being obtained from probes in a population of probes, each probe being associated with a network element, comprising:
  receiving a first-stage set of probe reports comprising, in respect of each of a plurality of probes in an initial subset of the population of probes, a test result and metadata, each test result indicating a state of or state in respect of the network element associated with the probe;
  identifying a specific subset of one or more probes in the initial subset wherein the test result or results from the one or more probes in the specific subset satisfy a predefined condition;
  determining a subsequent subset of the population of probes in dependence on the metadata of the at least one probe in the specific subset; and
  triggering the probes in the subsequent subset to provide a second-stage set of probe reports comprising test results indicating states of or states in respect of network elements associated with probes in the subsequent subset.

According to embodiments, the network elements may be or include portions of the network. Alternatively or additionally, the network elements may be or include devices in the network.

It will be understood that the state of or state in respect of a network element may relate to a state of the network element in its own right and/or to a state in respect of the network element, such as performance as experienced by it or by devices associated with it, or performance on a path between a remote location (such as a test-server or another network node) and the network element or devices associated with it.

According to embodiments, a specific subset may comprise one or more probes of the initial subset the test result from each of which indicates that the state of or state in respect of the network element with which the probe is associated satisfies a predefined condition. This may be determined in dependence on one or more performance criteria, thresholds or ranges, for example.

According to embodiments, a specific subset may comprise a plurality of probes of the initial subset. In such embodiments, the predefined condition may be that the test results indicate a level of similarity between states of or states in respect of the network elements with which the plurality of probes are associated. The level of similarity may be a predefined level of similarity between states of or states in respect of the network elements with which the plurality of probes are associated. Alternatively, it may be a level of similarity "learned" according to one or more learning rules.

According to embodiments, the predefined condition may be a condition indicative of a predetermined state or performance level in respect of a network element. The step of identifying the specific subset may thus comprise identifying a plurality of probes of the initial subset the test results from which indicate a level of similarity between states of or states in respect of the network elements with which the plurality of probes are associated, or identifying probes each of which initially satisfies a state or condition of interest.

According to embodiments, the metadata received in respect of each probe in the initial subset may comprise metadata in respect of each of a plurality of metadata characteristics. Such metadata or a part thereof may be received from the probes, possibly together with the test results, but it may be stored and obtained from elsewhere, perhaps in dependence on indications received from the probes of their identities or of the identities of the network elements with which they are associated. The metadata in respect of the probes may therefore simply be held by or local to a probe controller that is to analyse the test results received from the probes.

In relation to embodiments in which the metadata received in respect of probes in the initial subset comprises metadata in respect of each of a plurality of metadata characteristics, the step of determining a subsequent subset of the population of probes may comprise determining the subsequent subset in dependence on one or more of the plurality of metadata characteristics received in respect of the at least one probe in the specific subset.

According to embodiments, the metadata received in respect of the probes in the initial subset may comprise metadata in respect of one or more metadata characteristics selected from the following:
  one or more characteristics associated with one or more communications connections;
  one or more characteristics associated with one or more probes;
  one or more characteristics associated with one or more communications devices;
  one or more characteristics associated with a network topology location of one or more probes and/or of one or more communications devices;
  one or more characteristics associated with one or more communications services,
  one or more characteristics associated with one or more customers or customer accounts.

Some more specific examples of possible metadata characteristics include characteristics such as locations in the network topology (of the probe or network element concerned, or of the relevant exchange, AP and RAN); types of equipment (i.e. of a home hub, gateway device or other Customer Premises Equipment (CPE), and/or whether this is implemented in hardware, firmware or software); a customer's contract or service tier; the type of network equipment that a customer's traffic passes (DPI box—hardware, firmware, software, specific configuration); distance from the exchange; whether the customer concerned is in "special measures" (e.g. having exceeded a monthly quota, for example), or others. Metadata associated with a probe itself may include or indicate its version number, type (e.g. physical device, implemented in software, implemented with "network function virtualisation" (NFV) (which could mean that it stays with the function wherever in the NFV cloud the function is instantiated); or otherwise.

According to embodiments, the test results received from the probes in the initial subset and/or from the one or more probes in the specific subset may comprise data in respect of one or more test characteristics selected from the following:
  one or more characteristics associated with communication speed;
  one or more characteristics associated with communication delay and/or delay variation;
  one or more characteristics associated with communication volume;
  one or more characteristics associated with reliability;
  one or more characteristics associated with data loss;
  one or more characteristics associated with a communications path used;
  one or more characteristics associated with communications quality;
  one or more characteristics associated with security;
  one or more characteristics associated with service usage.

Some more specific examples of possible test characteristics include characteristics such as download speed, upload speed, time taken to perform a specific action (e.g. fetch a page and all of its resources from a particular website, or buffer particular streamed content, for example), upstream or downstream packet loss, upstream or downstream jitter, round-trip or UDP latency, UDP packet loss, UDP contiguous loss, DNS resolution time, FTP throughput, peer-to-peer throughput, time taken to relay an email, etc. Reliability may relate to various sorts of failures or disconnections, for example. Communications path characteristics may involve "traceroute", which allows a determination of which routers test traffic goes through, for example. Communications quality characteristics may involve objectively-determined characteristics and/or subjectively-determined characteristics (based on user feedback, for example).

According to embodiments, the test results received from the probes in the initial subset and/or from the one or more probes in the specific subset may be indicative of states of or states in respect of corresponding network elements.

According to embodiments, the subsequent subset of the population of probes may comprise probes all of which have the same or similar metadata as the one or more probes in the specific subset. Alternatively or additionally, the subsequent subset of the population of probes may comprise one or more probes which have the same or similar metadata as the one or more probes in the specific subset, and one or more probes which have the different metadata to the one or more probes in the specific subset (i.e. one or more "control" probes).

According to a second aspect of the invention, there is provided a probe controller to obtain diagnostic test results in respect of network elements in a network, the test results being obtained from probes in a population of probes, each probe being associated with a network element, the probe controller comprising:
  an interface communicatively coupled to the probes and being adapted to receive a first-stage set of probe reports comprising, in respect of each of a plurality of probes in an initial subset of the population of probes, a test result and metadata, each test result indicating a state of or state in respect of the network element associated with the probe; and
  a processor adapted to identify a specific subset of one or more probes in the initial subset wherein the test result or results from the one or more probes in the specific subset satisfy a predefined condition, and to determine a subsequent subset of the population of probes in dependence on the metadata of the at least one probe in the specific subset, wherein the interface is further adapted to communicate with the probes in the subsequent subset of probes to trigger the probes in the subsequent subset to provide a second-stage set of probe reports.

According to a third aspect of the invention, there is provided a computer program element comprising computer program code to, when loaded into a computer system and executed thereon, cause the computer to perform the steps of a method according to the first aspect. The various options and preferred embodiments referred to above in relation to the first aspect are also applicable in relation to the second and third aspects.

Using preferred embodiments, the results of one stage of testing (i.e. a test or set of tests performed in respect of one or more "initial" subsets of probes) can be used to trigger a subsequent stage of testing to be performed in respect of one or more other "subsequent" subsets of probes, based on their metadata. If, for example, there appears from the first stage of testing to be a pattern of poor performance (or a particular type of problem) from probes within the subset(s) tested in the first stage, the metadata of those probes can be used to create one or more subsequent subsets of the whole population of probes, which can then be tested immediately in order to home in on a common cause of the issue/problem.

An advantage of such embodiments is that the cause of issues/problems can be narrowed down more rapidly, automatically (i.e. without a human expert to analyse the results), more accurately, and in a more scalable manner.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

With reference to the accompanying figures, methods and apparatus according to preferred embodiment will be described.

Figure 1:
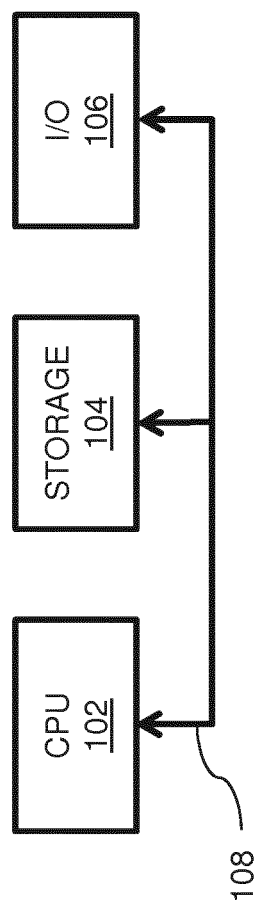
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a data store 104 and an input/output (I/O) interface 106 via a data bus 108. The data store 104 can be any read/write storage device or combination of devices such as a random access memory (RAM) or a non-volatile storage device, and can be used for storing executable and/or non-executable data. Examples of non-volatile storage devices include disk or tape storage devices. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
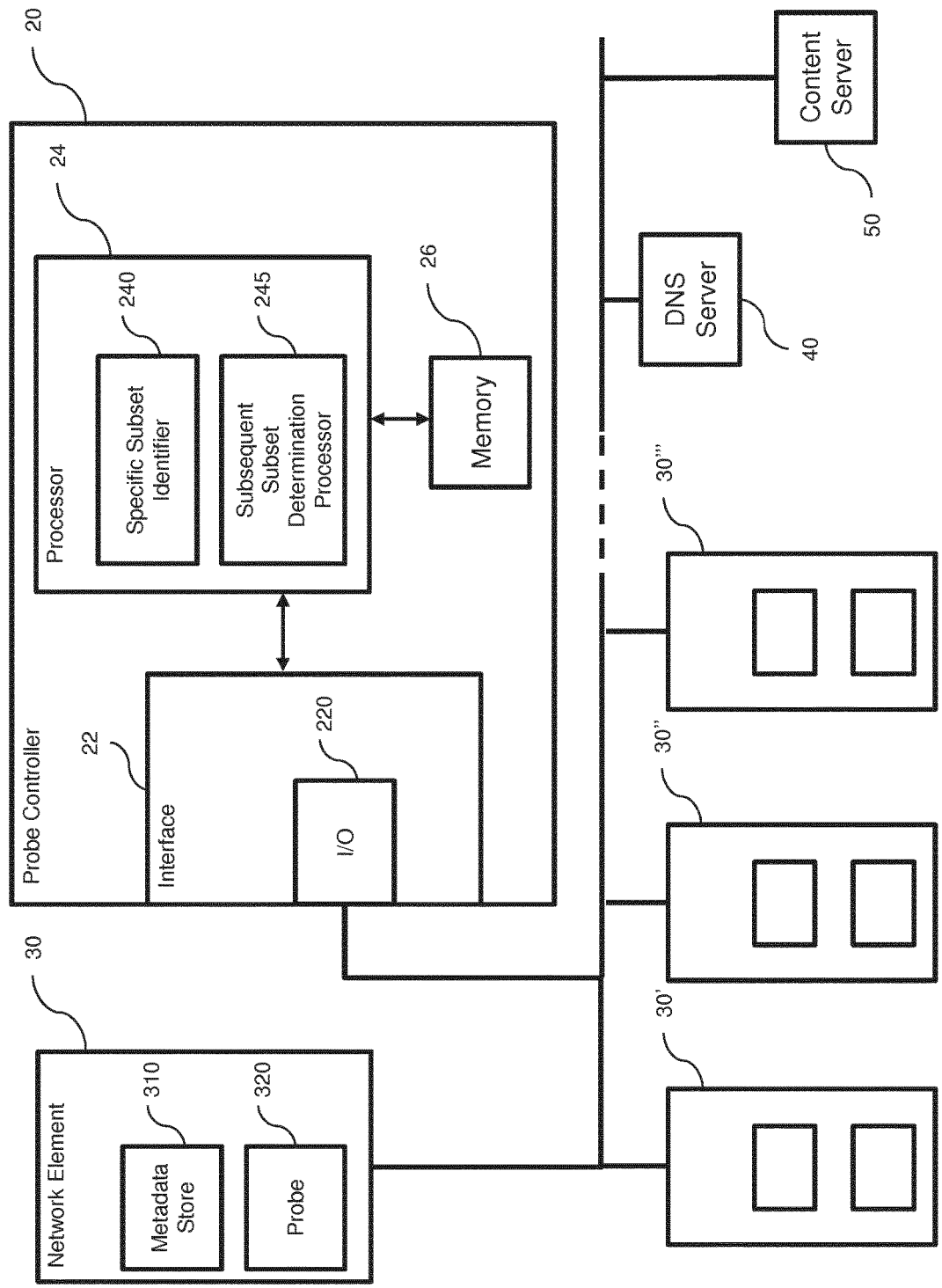
FIG. 2 is a component diagram showing a probe controller in accordance with an embodiment of the invention, in communication with a number of network elements and other networked entities.

FIG. 2 is a component diagram showing a probe controller in accordance with an embodiment of the invention, in communication with a number of network elements and other networked entities. A probe controller 20 (which may be implemented using or operated by a computer system such as that shown in FIG. 1) is shown in communication via a network such as the Internet with several network elements 30, 30', 30", 30'" (one of which, 30, is shown in detail). The network elements 30 are also in communication with other network elements, symbolised by a Domain Name System (DNS) server 40 and a content server 50.

The probe controller 20 has an interface 22 with input and output (I/O) functionality 220, the input functionality allowing data to be received from the network elements 30 and from other entities, and the output functionality allowing instructions and other data to be sent to the network elements 30 and from other entities. It also has a processor 24, part of the functionality of which will be explained in more detail later, and may have a memory 26 for storage of data such as metadata (received from probes or from a network management system, for example), measurement results or measurement schedules, for example.

It will be noted that while FIG. 2 and the subsequent figures and associated text relate to embodiments in which a single probe controller instructs probes as to what tests to perform and when, receives results, performs subsequent analysis, etc., a probe controller may comprise more than one functional module, and these need not be co-located. Alternatively, there may be more than one probe controller. For example, there may be (several) data collectors, each of which obtains measurement reports from one or more probes. These may share information or otherwise collaborate whereby to act as and/or perform the functionality of the probe controller of the main embodiment as shown and described.

The network elements 30 may be or include hub devices or network gateway devices of Local Area Networks (LANs) for example, or other networked devices within or associated with a LAN or another such portion of a network. Alternatively, the network elements may be or include devices such as routers. In a further alternative, the network elements may in fact be or include elements or portions of a network (such as LANs) themselves, or other such portions of an overall network such as the Internet.

Associated with each network element 30 is a metadata store 310 and at least one probe 320. These may be hardware- or software-implemented devices or modules located within or in communication with the associated network element 30. Where the network elements 30 are home hubs or network gateway devices acting in respect of LANs, for example, for example, the metadata stores 310 and probes 320 may be incorporated therein, or may be separate devices or parts thereof in communication the associated network element 30. A metadata store 310 may be a simple memory of the associated network element 30, with the metadata itself being implemented as a data-structure stored in the memory, for example.

It will be noted that the metadata store associated with a network element need not be located in or near the network element itself—it (or at least a part thereof) may be held elsewhere, by the probe controller 20, for example. While some metadata may be stored by the probe and/or the network element, and/or in a metadata store local to the probe and/or the network element concerned, and may get sent from there to the controller in association with the test result(s) as part of a probe report, there may be metadata that isn't sent with the test results—such as the location of the probe and/or the network element in the network topology, for example (which RAN and/or AP the probe and/or network element is connected to, for example). Such metadata may be held by the probe controller or otherwise by a network management system, for example.

The probes 320 are arranged to obtain test results based on measurements of various performance-related or other characteristics in respect of their associated network element 30. As will be explained later, such test results may be obtained by active testing or by passive testing/monitoring. The probes 320, the network elements 30, or additional reporting devices associated therewith then provide respective probe reports to the probe controller 20 containing test results indicative of those performance or other measurements.

The respective test results may indicate a state of the network element associated with the probe, the state of a network element generally being indicative of a measure of performance of the network (either in general or from the point of view of the network element) or of the network element in question. These may relate to characteristics such as download speed, upload speed, time taken to perform a specific action (e.g. to fetch a page and all of its resources from a particular website, or to buffer particular streamed content. for example), upstream or downstream packet loss, upstream or downstream jitter, round-trip or UDP latency, UDP packet loss, UDP contiguous loss, DNS resolution time, FTP throughput, peer-to-peer throughput, time taken to relay an email, or others), and may be obtained through active testing (e.g. performing a test such as sending a request to a remote server such as the DNS server 40 and measuring the time before a response is received) or passive monitoring (observing data rates, etc.).

It will be noted that as well as the probe controller 20 and a number of network elements 30, a DNS server 40 and a content server 50 are shown. These may be network elements with associated probes and metadata. In this example, however, they are shown to illustrate the possibility that tests carried out by probes 320 in network elements 30 such as home hubs may involve sending requests to and/or receiving responses from such servers 40, 50.

Turning now to the metadata held in the metadata stores 310 associated with the respective network elements 30, these may relate to features associated with the specific broadband line, a piece of equipment in or associated with the network element in question, a type of service, and/or details of the customer concerned, etc. They may relate for example to the location in the network topology of the network element concerned (in terms of the relevant exchange, the Retail Access Nodes (RAN) and/or the Aggregation Point (AP), for example); the type of home hub or other Customer Premises Equipment (CPE); the type or nature of the customer's contract or service tier; the type of network equipment that the particular customer's network traffic passes through; the distance from the exchange; whether the customer has exceeded a monthly quota, or other factors. In general, the metadata in respect of a particular network element may comprise data relating to a number of different "element characteristics" such as (but not limited to) those listed above. These may relate to configuration of, context of, the arrangement of, or other characteristics of the element.

It will be noted that in cases where a (main) metadata store associated with a network element is not held by the network element, it may be arranged that probes simply provide indications of their identity to the probe controller which then retrieves metadata in respect of or associated with the probes and/or network elements from its own or a separate store, for example.

A technique in which diagnostic test results may be obtained in respect of network elements 30 by a probe controller 20 such as that shown in FIG. 2 will now be explained with reference to FIG. 3, the parts of which illustrate various stages in such a technique, and FIG. 4, which is a flow-chart illustrating a possible method of performing diagnostic testing according to a preferred embodiment.

It will be appreciated that FIG. 3 only shows twelve network elements 30a, 30b, 30c, ..., 30l reporting to the probe controller 20. This is for the purpose of simplifying the figures and explanation—it will be apparent that in a large network, a probe controller 20 may receive reports from or in respect of tens, hundreds, thousands or even millions of network elements.

Figure 3A:
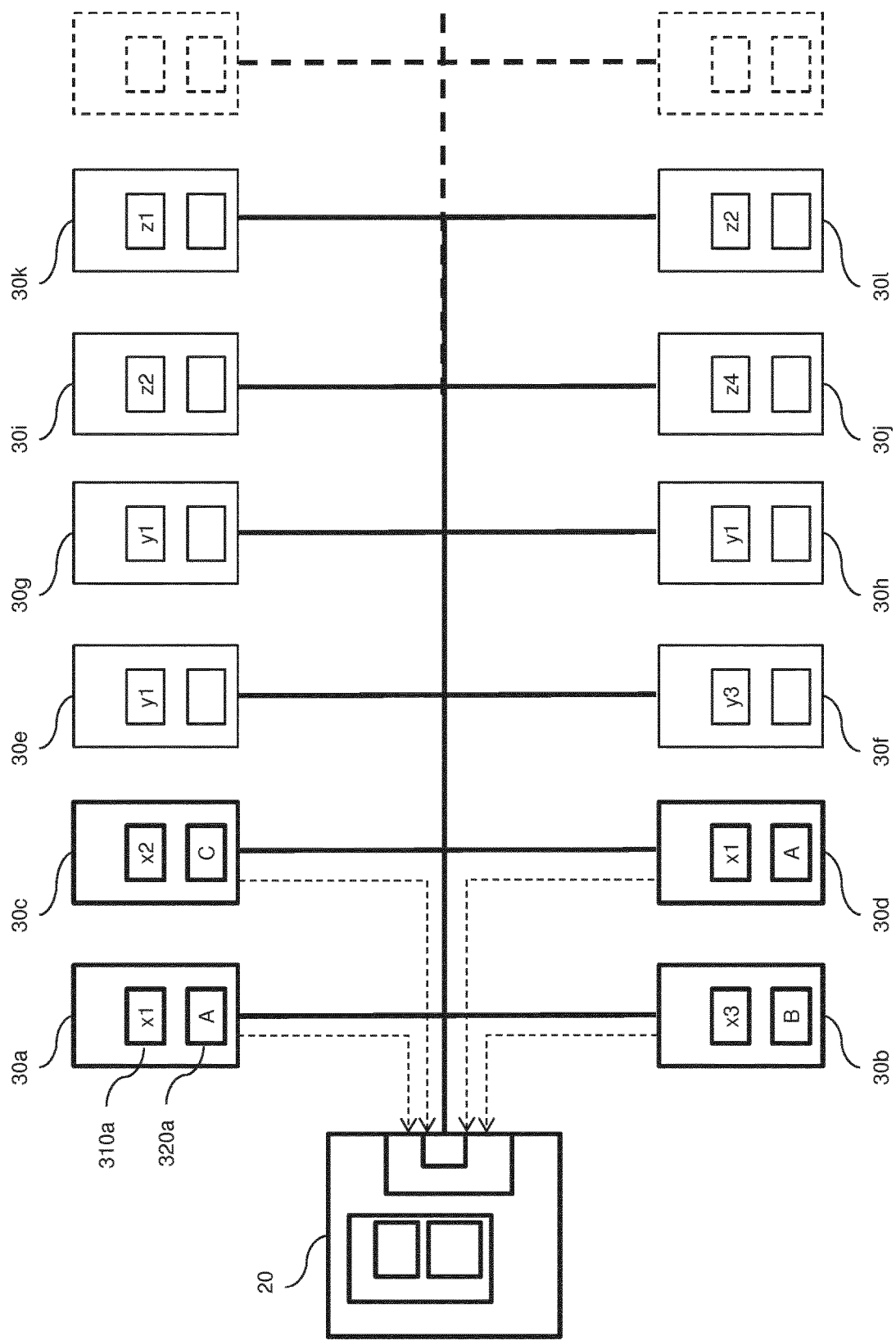
FIGS. 3(*a*), 3(*b*), 3(*c*) illustrate various possible stages in the performance of a technique in accordance with an embodiment of the invention.

Further, it will be appreciated that each network element 30 in FIG. 3 is shown as having metadata comprising only two characteristics in its metadata store 310, and is shown as being arranged to provide a single test result indicative of one test characteristic (i.e. in FIG. 3(a), network element 30a is shown as having metadata "x1" in its metadata store 310a, with "x" relating to one metadata characteristic and "1" relating to another metadata characteristic, and is shown as being arranged to provide test result "A" in respect of one test characteristic), whereas in a more general scenario, each network element 30 may have metadata comprising a large number of metadata characteristics in its metadata store 310, and may be arranged to provide test results indicative of a few or several characteristics in its probe reports (which may comprise some or all of those in use).

Figure 4:
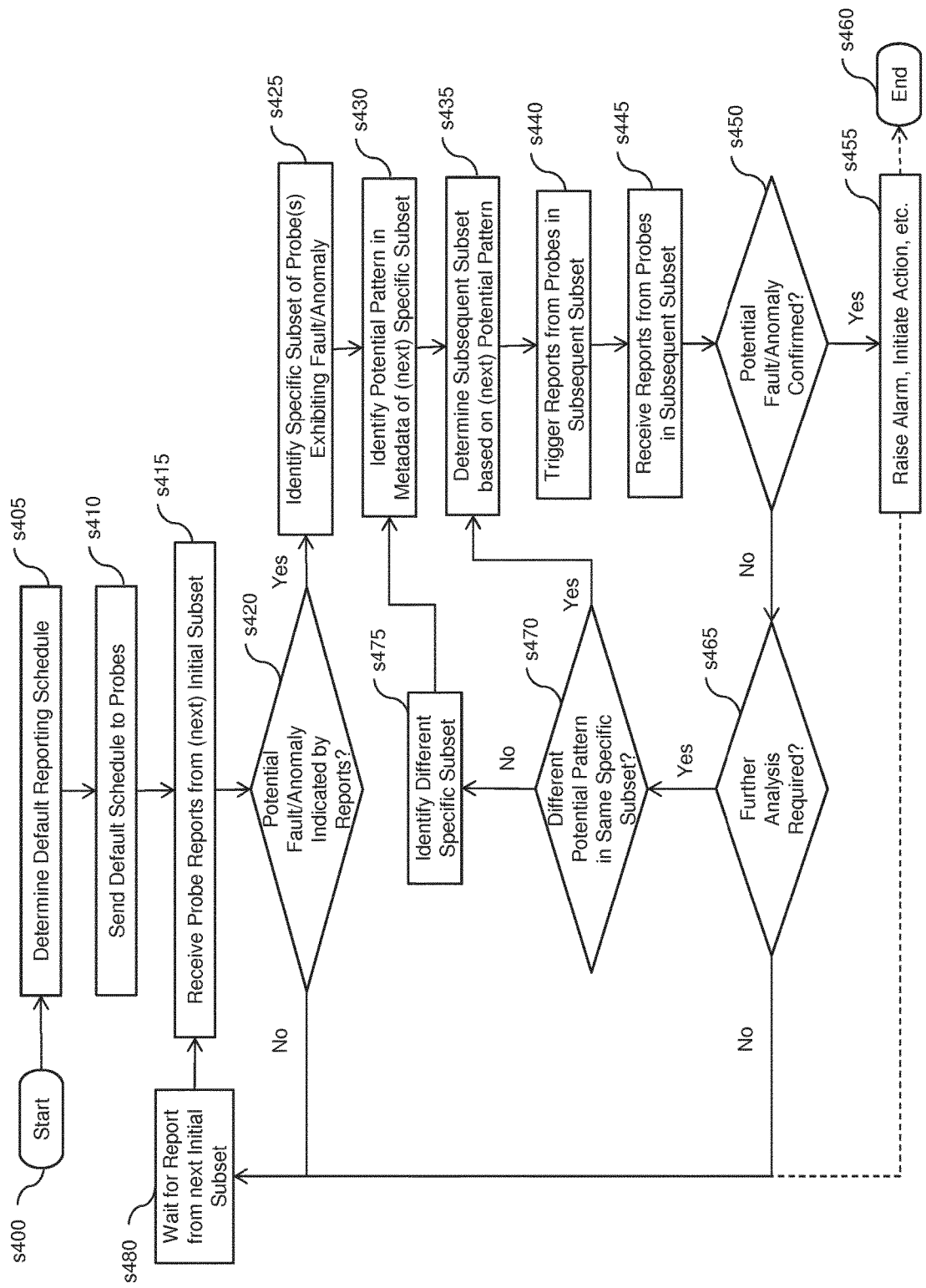
FIG. 4 is a flow-chart illustrating a possible method of performing diagnostic testing according to a preferred embodiment.

Initially, and starting from step s400 in FIG. 4, the probe controller 20 determines a default (measurement and/or reporting) schedule (step s405). (It will be noted that there may be a single schedule, or there may be separate schedules for when tests are done and for when results are reported. It will also be noted that the schedule(s) need not be determined by the probe controller itself—it/they may be provided to the probe controller by a human operator or otherwise). In this example, the probe controller then sends the schedule (or relevant parts thereof) to the probes (step s410) or otherwise instructs the probes 30 to perform tests and provide reports according to a predetermined schedule. According to this, it will receive probe reports from a first "Initial Subset" of probes in due course (step s415) (and later, according to the schedule, from probes in other "initial subsets"). (It will be noted that the probes might have a "starting set" (or "factory set") of tests built-in, which may be used and/or updated. It will also be noted that the probes may request (or "pull") the schedule or relevant instructions from the controller.)

The instructions may involve some or all of the probes being instructed to perform the same test or set of tests, but with different subsets of the probes being instructed to perform their tests and/or provide reports at different times. This may be to avoid measurement traffic overloading the network and/or to avoid too many reports being received within the same period. The initial subsets may be selected on geographic or topological grounds, for example, with members of an initial subset either being similar on such grounds, or different on such grounds. Alternatively, the initial subsets may be selected according to other characteristics, randomly, or in other ways. In FIG. 3(a), it will be seen that the probe controller 20 has instructed a first "initial subset" involving just the first four probes 30a, 30b, 30c and 30d (shown in thicker lines) of the twelve probes shown to provide probe reports, and is receiving probe reports from those four (indicated by the dashed lines between them and the probe controller 20). After successive scheduled testing periods, probe reports may be received from the next four probes 30e, 30f, 30g and 30h, then from probes 30i, 30j, 30k and 30l, for example, when the system is operating in a scheduled testing phase.

In such a scheduled testing phase, the predetermined period may be of the order of seconds, minutes, hours, days, weeks or months, depending on factors such as the overall number of network elements in the system and the number whose reports can be processed at a time by the probe controller 20. Such probe reports—which may be thought of as "first-stage" probe reports, may be received in respect of each network element once per period, or more often. It will also be understood that "one-off" tests are possible (for example, if a customer contacts a network service-provider to report a problem, an immediate report could be triggered, with one or more probes being triggered to run one or more tests immediately). Also, the regular test schedule can be updated, for example in order to redefine the default subsets, or to incorporate a new test.

Under normal, scheduled operation, however, the probe controller 20 may receive "first-stage" probe reports in respect of a first default subset of network elements (e.g. network elements 30a to 30d) for one period (e.g. one test report every day for one month), then receive corresponding "first-stage" probe reports from a second default subset (e.g. network elements 30e to 30h) for the next period, then receive corresponding "first-stage" probe reports from a third default subset (e.g. network elements 30i to 30l) for a third period, continuing on through all of the default subsets before returning to the first, with the reports from each subset being analysed by the probe controller 20, and appropriate action being taken in the event that those reports indicate a problem or potential problem, or anomalous behaviour that warrants investigation.

At step s420, the "first-stage" probe reports from the current "initial subset" are analysed in order to determine whether they indicate any potential problem, fault, anomaly, inefficiency, sub-optimal configuration, misconfiguration, etc. If not, the process may continue via step s480 (during which the probe controller 20 may simply wait for probe reports from the next "initial subset" according to the default schedule) before passing via step s415 again and processing those new "first-stage" probe reports accordingly.

If it is decided at step s420 that the probe reports from the current "initial subset" do indicate that there may be an issue that warrants investigation (i.e. a fault, anomaly, etc.), an alarm may be raised and/or action may be triggered in respect thereof.

According to the present technique however, if such analysis at step s420 identifies a state of operation of an associated network element indicating a potential problem, fault, inefficiency, sub-optimal configuration, misconfiguration or anomalous behaviour being identified in respect of one or more network elements in the current "initial" subset (i.e. the one currently providing "first-stage" probe reports), a module of the probe controller 20 referred to as the "specific subset identifier module" 240 analyses the probe reports in order to identify a more specific subset containing just those probes (or just one probe) within the current initial subset that is/are exhibiting the fault or anomaly (step s425). It then inspects the metadata received with the probe reports concerned (or otherwise associated with the probe concerned) (step s430) in order to identify what metadata characteristic or characteristics appear to be common to the network elements in the initial subset in respect of which probe reports are indicating potentially problematic or anomalous state or behaviour.

This identification of a "specific" subset within the current "initial" subset may be done by identifying individual test results from probes that meet or fail to meet a predetermined performance target or threshold, for example, or may be done by obtaining an overall performance measure as a function of a number of different performance characteristics and identifying network elements in respect of which the overall performance measure meets or fails to meet a predetermined overall performance target or threshold.

Alternatively, the identification of a "specific" subset may be done by using a clustering technique in order to identify clusters of similar results and/or "outliers" (i.e. anomalous results), and need not concentrate on "problematic" behaviour—the anomalous behaviour identified may in fact be behaviour indicative of "good" or "better-than-average" performance, for example, rather than "problematic", "poor" or "worse-than-average" performance.

As part of this identification, earlier results (which may be from different subsets of probes) may also be examined. For example, if analysis of the current results (from the current subset) suggests more than one hypothesis, analysis of earlier positive and/or negative results may indicate that one or more hypotheses is/are more or less likely than others. If, for example, current results indicate that an issue may be linked either to metadata parameter number 45 or to metadata parameter number 97 but earlier results indicate that it is unlikely to be linked to metadata parameter number 45, further analysis may concentrate on establishing whether there is an issue linked to metadata parameter number 97.

Essentially, the function of the specific subset identifier module 240 may be thought of as being to form one or more hypotheses (in terms of metadata characteristics) as to the cause of the observed "behaviour of interest", the or each hypothesis being characterised by a possible metadata element or combination of metadata elements specific to a network element exhibiting the "behaviour of interest", or being characterised by a possible metadata element or combination of metadata elements that appear to be common to a number of network elements exhibiting the "behaviour of interest". Subsequent analysis and testing can then be performed to support or counter the or each initial hypothesis.

Irrespective of the manner in which the specific subset is identified within the initial subset, the next stage, performed by a module of the probe controller 20 referred to as the subsequent subset determination processor 245, involves determining a subsequent subset (step s435) of the full set of probes (i.e. not just from the current "initial subset") in dependence on the metadata of the probe or probes in the "specific subset". If, for example, it has been found that, of the probes in the initial subset, there appears to be anomalous behaviour from each of those whose metadata includes value "x" for a particular metadata characteristic, the subsequent subset may be arranged to comprise all probes in the overall population of probes having value "x" for that particular metadata characteristic.

Then, instead of simply proceeding according to the normal, scheduled operation, all probes in the subsequent subset may immediately be triggered (step s440) to provide what may be thought of as "second-stage" probe reports, irrespective of whether or not they would have been due to provide probe reports at that time (or in the next reporting period, for example) according the default reporting schedule. These are then received at step s445.

The triggering of "second-stage" probe reports from probes in the subsequent subset may be instead of or as well as any scheduled probe reports, but subsequent analysis of the test results in respect of the network elements in the subsequent subset (i.e. having one or more metadata characteristics in common with those in the specific subset) may then be performed in order to determine whether the potential problem or behavioural pattern identified in respect of the initial subset can be confirmed over a larger sample, or refuted (step s450). If it can be confirmed (i.e. from analysis of the "second-stage" probe reports), an alarm may be raised and/or action may be triggered in respect thereof (step s455) and the process (in respect of the current initial subset, at least) may end (step s460). Alternatively, the process may continue via step s480 (until probe reports from the next "initial subset" are received) then pass via step s415 again and process those new "first-stage" probe reports.

If the potential problem or behavioural pattern identified in respect of the initial subset is not confirmed at step s450, it may be decided (at step s465) that no further analysis is required, in which case the process may simply repeat via steps s480 and s415 as above. Alternatively, it may be decided that further analysis is required, in which case the process may proceed via step s470, in which a different potential pattern may be identified by analysing the same specific subset as before, then proceeding via step s435 in respect of the next potential pattern, and/or via step s475, in which a different specific subset may be identified by analysing the "first-stage" reports from the initial subset, then proceeding via step s430 in respect of the next specific subset.

Figure 3B:
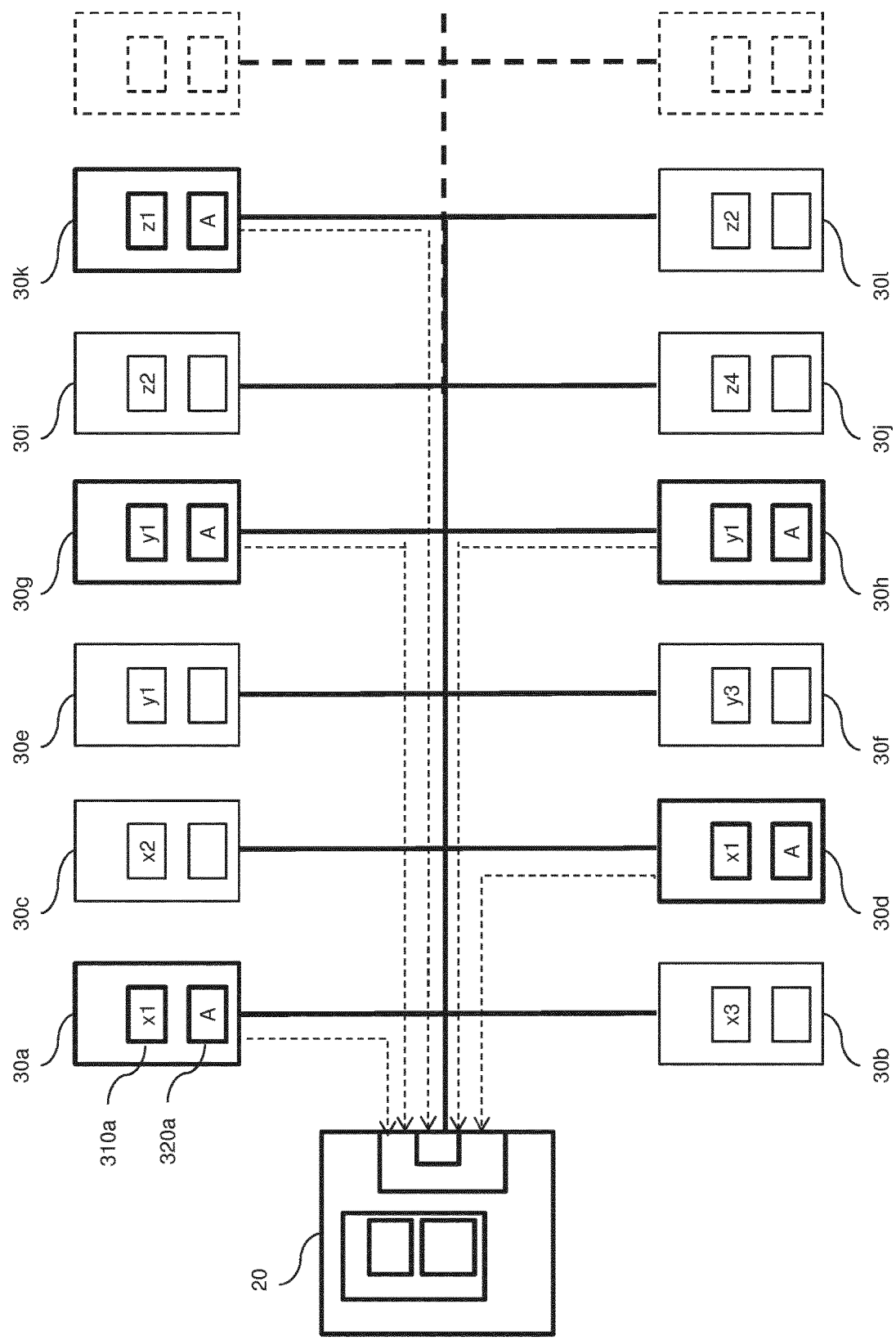
Figure 3C:
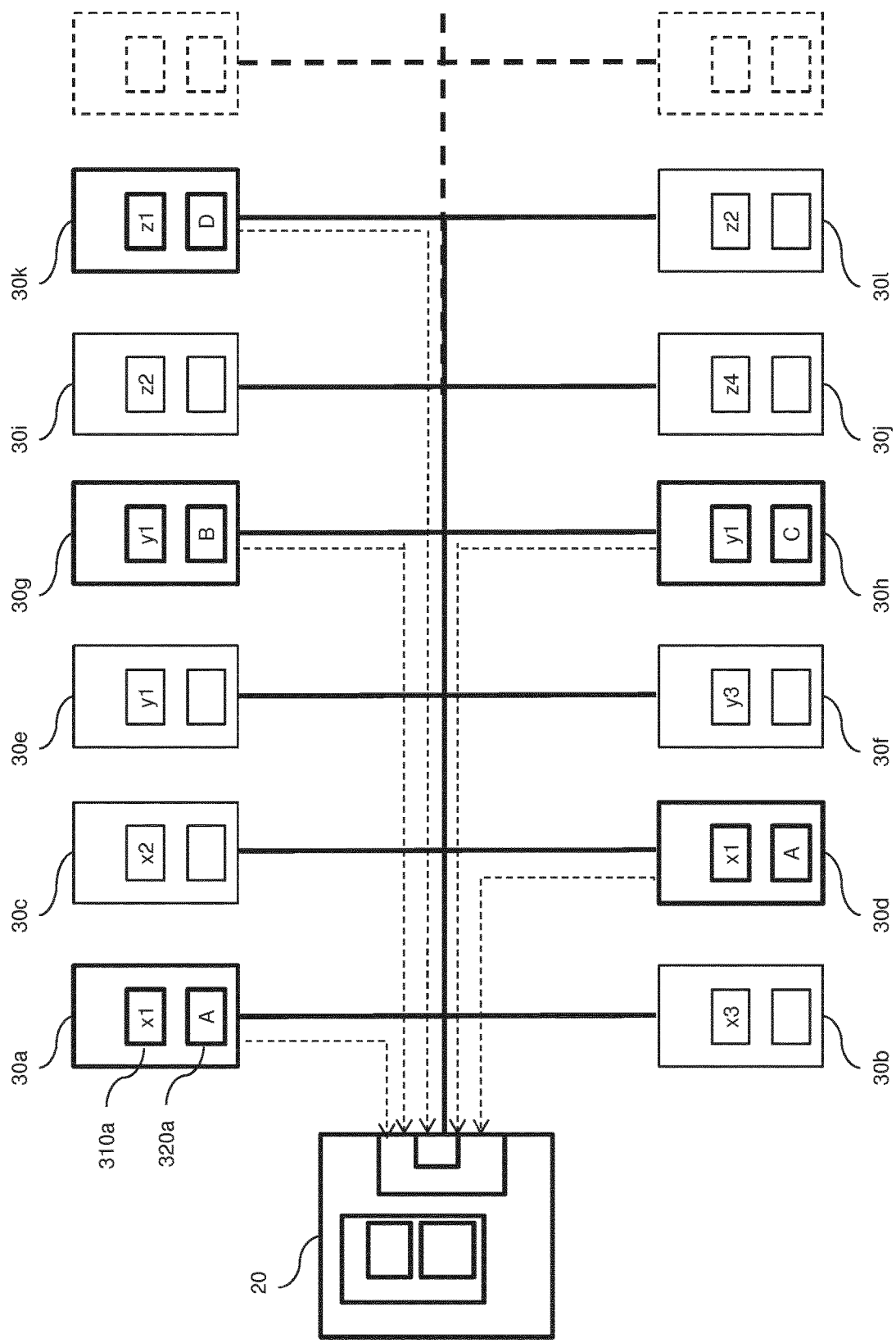

The above process will now be illustrated with reference to FIGS. 3(a), 3(b) and 3(c).

As indicated earlier, FIG. 3(a) illustrates an initial situation in which the first four probes 30a, 30b, 30c and 30d of twelve are fulfilling their part in complying with a default reporting schedule to provide probe reports to the probe controller 20. This is therefore receiving probe reports from just those four (indicated by the dashed lines between them and the probe controller 20), as instructed according to the default reporting schedule. Of the respective probe reports, it will be seen that those received in respect of network elements 30a and 30d both include a test result "A", while the probe reports received in respect of network elements 30b and 30c include the test results "B" and "C" respectively. For the purposes of this example, we will assume that test result "A" is indicative of poor performance, whereas test results "B" and "C" are indicative of different levels of good performance. The specific subset identifier module 240 thus identifies the subset containing just network elements 30a and 30d as the "specific subset" which is to form the basis of further "follow-up" testing (i.e. in order to support or counter the hypothesis that there is a common cause of the poor performance currently being exhibited by network elements 30a and 30d), and therefore analyses the metadata associated with the respective network elements, identifying that while all four network elements have the value "x" in respect of the first metadata characteristic, network elements 30a and 30d are the only ones in the initial subset that have the value "1" in respect of the second metadata characteristic, network elements 30b and 30c having the values "2" and "3" respectively. This information is passed to the subsequent subset determination processor 245.

The subsequent subset determination processor 245 then uses the metadata to determine a subsequent subset of probes for immediate "follow-up" testing, the members of which are probes reporting from any network elements in respect of which the value of the second metadata characteristic is "1". It immediately instructs those probes to run a test or set of tests and/or provide reports. This is illustrated by FIG. 3(b), which illustrates the situation in which probes 30a, 30d, 30g, 30h and 30k of the probes have been triggered to provide a second-stage set of probe reports (indicated by the dashed lines between them and the probe controller 20). It may be deemed unnecessary to obtain probe reports in the second-stage from probes (such as probes 30a, 30d) which have provided reports as part of the initial subset according to the default reporting schedule, of course.

It may also be decided not to trigger all probes with the relevant metadata characteristic(s) (i.e. those with "1" for the second metadata characteristic in this example), since this may generate too much test traffic or too much associated signalling, or may place too much of a processing overhead on the controller. In the example in FIG. 3b, probe 30e has metadata "1" but is not instructed to perform a "second stage" test.

It may also decide to include some probes in the "second stage" test that do not have metadata "1", since a negative result from those probes will help to confirm the hypothesis. For example, it could request probe 30i (with metadata "2") to run the "second stage" test.

In this example, each of the probes involved in the second-stage of testing is shown providing the test result "A", which would be indicative of a correlation between the performance level or state indicated by the test result "A" and whether a network element has metadata characteristic "1". It may of course be found in the second-stage that there is no such correlation (as illustrated by FIG. 3(c), in which probes 30g, 30h and 30k are shown providing test results "B", "C" and "D" respectively), in which case the specific subset identifier module 240 may attempt to identify a different specific subset of the initial subset of probes, the subsequent subset determination processor 245 may then determine a different subsequent subset, and probes in that subset may then be triggered to provide probe reports. A third alternative may be that the results from the second stage may be mixed, indicating that more specific analysis is required in order to determine a metadata combination that is common to those probes from which test results of interest have been received—in this case, such analysis could be performed by subjecting the results of the second-stage testing to further analysis themselves in a corresponding manner.

Returning to the analysis of the first-stage probe reports initially received from the first four probes 30a, 30b, 30c and 30d in accordance with the default reporting schedule, it will be appreciated that in another scenario, test result "A" may be indicative of good or satisfactory performance while test results "B" and "C" may be indicative of different levels or types of unsatisfactory performance. In such a scenario, the specific subset identifier module 240 may identify the subset containing just network elements 30b and 30c as the "specific subset" which is to form the basis of further "follow-up" testing (i.e. in order to support or counter the hypothesis that there is a common cause of the poor performance currently being exhibited by network elements 30b and 30c), and the metadata associated with those network elements may be used by the subsequent subset determination processor 245 in order to determine a subsequent subset of probes for immediate "follow-up" testing. Alternatively or additionally, the results in respect of network elements 30b and 30c may be treated separately, with the specific subset identifier module 240 identifying separate subsets, one containing just network element 30b and the other containing just network element 30c, and use each of these individually as specific subsets on which to base "follow-up" testing.

It will be understood that in scenarios where there are large numbers of parameters (rather than just the two metadata characteristics symbolised by the values {x, y, z} and {1, 2, 3, 4} in FIG. 3), the identification of specific subsets in particular may be significantly more complex than it is in the above example. It may involve identifying specific subsets on the basis of which of the probes in the current initial subset that are found to warrant further analysis have the largest number of matching parameters, for example. Alternatively, the identification of specific subsets may involve consideration of characteristics such as dates (or other numerical values) within a range. It will be appreciated that many other types of, and techniques for, "pattern-spotting" from the "first-stage" probe reports may be used.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of obtaining diagnostic test results in respect of network elements in a network, the diagnostic test results being obtained from probes in a population of probes, each probe being associated with a network element, the method comprising:

receiving a first-stage set of probe reports comprising, in respect of each of a plurality of probes in an initial subset of the population of probes, a test result and metadata, each test result indicating a state of or state in respect of the network element associated with a probe;

identifying, in dependence on the test results received in respect of the plurality of probes in the initial subset, a specific, subset of one or more probes in the initial subset wherein the test result or results from the one or more probes in the specific subset satisfy a predefined condition;

analyzing a metadata of at least one probe in the specific subset to identify at least one metadata characteristic;

determining a subsequent subset of a plurality of probes in the population of probes in dependence on the at least one metadata characteristic identified from the analysis of the metadata of the at least one probe in the specific subset; and triggering the plurality of probes in the subsequent subset to provide a second-stage set of probe reports comprising test results indicating states of or states in respect of network elements associated with the plurality of probes in the subsequent subset.

2. A method according to claim 1 wherein the network elements include portions of the network.

3. A method according to claim 1 wherein the network elements include devices in the network.

4. A method according to claim 1 wherein the specific, subset comprises one or more probes of the initial subset, the test result from each of the one or more probes in the specific subset indicates that the state of or the state in respect of the network element with which the probe is associated satisfies the predefined condition.

5. A method according to claim 1 wherein the specific subset comprises a plurality of probes of the initial subset.

6. A method according to claim 5 wherein the predefined condition is that the test results indicate a level of similarity between states of the network elements with which the plurality of probes of the initial subset are associated.

7. A method according to claim 1 wherein the predefined condition is a condition indicative of a predetermined state or performance level in respect of a network element.

8. A method according to claim 1 wherein the metadata received in respect of each probe in the initial subset comprises metadata in respect of each of a plurality of metadata characteristics.

9. A method according to claim 8 wherein determining the subsequent subset of the population of probes comprises determining the subsequent subset in dependence on a plurality of metadata characteristics identified from the analysis of the metadata of the at least one probe in the specific subset.

10. A method according to claim 1 wherein the metadata received in respect of the probes in the initial subset comprises metadata in respect of one or more metadata characteristics selected from the following:

one or more characteristics associated with one or more communications connections;

one or more characteristics associated with one or more probes;

one or more characteristics associated with one or more communications devices;

one or more characteristics associated with a network topology location of one or more probes and/or of one or more communications devices;

one or more characteristics associated with one or more communications services, one or more characteristics associated with one or more customers or customer accounts.

11. A method according to claim 1 wherein the test results received from the probes in the initial subset and/or from the one or more probes in the specific subset comprise data in respect of one or more test characteristics selected from the following:
- one or more characteristics associated with communication speed;
- one or more characteristics associated with communication delay and/or delay variation;
- one or more characteristics associated with communication volume;
- one or more characteristics associated with reliability;
- one or more characteristics associated with data loss;
- one or more characteristics associated with a communications path used;
- one or more characteristics associated with communications quality;
- one or more characteristics associated with security;
- one or more characteristics associated with service usage.

12. A method according to claim 1 wherein the test results received from the plurality of probes in the initial subset and/or from the one or more probes in the specific subset are indicative of states of or states in respect of corresponding network elements.

13. A method according to claim 1 wherein the subsequent subset of the population of probes comprises probes which have the same or similar metadata characteristic as the one or more probes in the specific subset.

14. A method according to claim 1 wherein the subsequent subset of the population of probes comprises one or more probes which have the same or similar metadata characteristic as the one or more probes in the specific subset, and one or more probes which have the different metadata characteristic to the one or more probes in the specific subset.

15. The method according to claim 1 wherein the specific subset of the one or more probes is a partial subset of the initial subset, the test result from each of the one or more probes in the specific subset indicates that the state of or the state in respect of the network element with which the probe is associated satisfies the predefined condition.

16. The method according to claim 15 wherein at least one of the plurality of probes included in the subsequent subset is not included in the initial subset and not included in the specific subset.

17. The method according to claim 15 wherein satisfaction of the predefined condition indicates that the state of or the state in respect of the network element with which the probe is associated is faulty or abnormal.

18. The method according to claim 1 further comprising: analyzing the second-stage set of probe reports to confirm a fault or abnormality in one or more of the network elements.

19. A probe controller to obtain diagnostic test results in respect of network elements in a network, the diagnostic test results being obtained from probes in a population of probes, each probe being associated with a network element, the probe controller comprising:
- an interface communicatively coupled to the probes and being adapted to receive a first-stage set of probe reports comprising, in respect of each of a plurality of probes in an initial subset of the population of probes, a test result and metadata, each test result indicating a state of or state in respect of the network element associated with a probe; and
- a processor adapted to identify, in dependence on the test results received in respect of the plurality of probes in the initial subset, a specific subset of one or more probes in the initial subset wherein the test result or results from the one or more probes in the specific subset satisfy a predefined condition, to analyze a metadata of one or more probes in the specific subset to identify at least one metadata characteristic, and to determine a subsequent subset of a plurality of probes in the population of probes in dependence on the at least one metadata characteristic identified from the analysis of the metadata of the one or more probes in the specific subset,
- wherein the interface is further adapted to communicate with the plurality of probes in the subsequent subset of probes to trigger the plurality of probes in the subsequent subset to provide a second-stage set of probe reports comprising test results indicating states of or states in respect of network elements associated with the plurality of probes in the subsequent subset.

20. The probe controller according to claim 19 wherein the specific subset of the one or more probes is a partial subset of the initial subset, the test result from each of the one or more probes in the specific subset indicates that the state of or the state in respect of the network element with which the probe is associated satisfies the predefined condition.

21. The probe controller according to claim 20 wherein at least one of the plurality of probes included in the subsequent subset is not included in the initial subset and not included in the specific subset.

22. The probe controller according to claim 20 wherein satisfaction of the predefined condition indicates that the state of or the state in respect of the network element with which the probe is associated is faulty or abnormal.

23. The probe controller according to claim 19, wherein the processor is further adapted to analyze the second-stage set of probe reports to confirm a fault or abnormality in one or more of the network elements.

24. A non-transitory computer-readable storage medium storing computer program code to, when loaded into a computer system and executed thereon, cause the computer system to perform the steps of a method as claimed in claim 1.

* * * * *